United States Patent [19]

Haug et al.

[11] 3,831,062

[45] Aug. 20, 1974

[54] RECTIFIER HEAT SINK PLATES WITH ALTERNATE SUPPORTING TABS

[75] Inventors: Gerhard Haug, Stuttgart; Frithjof Werner, Leinfelden, both of Germany

[73] Assignee: Robert Basch GmbH, Stuttgart, Germany

[22] Filed: Oct. 15, 1973

[21] Appl. No.: 407,345

[30] Foreign Application Priority Data

Oct. 14, 1972 Germany ............................ 2250577

[52] U.S. Cl. ............ 317/100, 317/234 W, 321/8 C

[51] Int. Cl. .......................... H02k 9/00, H05k 7/20

[58] Field of Search ..... 317/99, 100, 234 A, 234 H, 317/234 W, 234 Z; 174/15 R, 16 R, DIG. 5; 321/8 C; 310/68 R, 68 D; 339/112 R

[56] References Cited

UNITED STATES PATENTS

| | | | |
|---|---|---|---|
| 3,538,455 | 11/1970 | Florio | 317/234 W |
| 3,739,209 | 6/1973 | Drabik | 317/100 |

*Primary Examiner*—Robert K. Schaeffer
*Assistant Examiner*—Gerald P. Tolin
*Attorney, Agent, or Firm*—Flynn & Frishauf

[57] ABSTRACT

The heat sink plates on which the main current diodes are mounted have the shape of annular discs with outwardly extending tabs bent up at right angles with circumferential spacing between them sufficient for interfitting the tabs of the two heat sinks when they are superimposed with just enough spacing for insulation from each other. The main current diodes are mounted on the flat portions of the tabs and their free connection leads are connected to connection plates on a circuit connecting support plate, held in position on the upturned part of the tabs of the heat sinks, forming a sort of lid to the pot-shaped assembly and carrying clips for connections to the windings of the generator. There is a cut-out sector of the annular disc assembly to accommodate a brush, regulator, or both. Exciter diodes are mounted on the connection support plate with anodes connected to a metal strip extending around the inner circumference of the central hole of the annular disc and connection support plate, with its end extending for connection to the regulator or brush in the cut-out sector.

14 Claims, 7 Drawing Figures

RECTIFIER HEAT SINK PLATES WITH ALTERNATE SUPPORTING TABS

This invention relates to a rectifier unit for mounting compactly within the structure of an alternator such as is used in a motor vehicle.

In known rectifier units of this type heat sink bodies are provided in the form of metallic plates disposed in parallel planes and so arranged that, in a plan view of these planes, the two heat sink bodies do not overlap. The heat sinks of the rectifier unit must have a certain minimum size in order to provide sufficient cooling surface for the diodes. Since the heat sink plates of the heretofore usual rectifier units do not overlap, the overall dimensions of the rectifier assembly are necessarily rather large. With the trend of design continuing towards smaller components of undiminished rating, these known rectifier units are becoming more and more limited in the range of their applications. With the diodes thus spread out on nonoverlapping heat sink plates, the connections between the individual diodes require greater expense to provide the necessary wiring.

It is an object of the present invention to provide a rectifier unit meeting the requirements of miniaturization, and at the same time having the advantage of providing connection plates rather than wires for connecting the diodes in circuit in conjugate pairs. It is a further object of the invention to reduce the expense of assembly of the rectifier unit.

SUBJECT MATTER OF THE PRESENT INVENTION

Briefly, the heat sink plates are provided in the form of annular discs with peripheral tabs that are bent at right angles to the disc, with the tab spacing such that the two heat sinks can have their discs superposed while insulated from each other, with the tabs interfitting in alternating sequence. In one form of the invention an insulating plate may separate the annular disc portions of the heat sinks and an insulated rivet may fit the heat sinks and the intermediate insulation together in a sandwich.

The diodes have their free terminal leads extending into the space enclosed by the tabs. The diodes are mounted on the tab portions rather than on the overlapping annular disc portions of the heat sinks. The tabs are provided with notches to hold a circuit connection support plate on which conducting connection plates may be mounted to connect conjugate pairs of diodes. Notches on the tabs may also be used to hold positioning clips to maintain the relative position of the heat sink bodies.

Finally, exciter diodes may be connected between the aforesaid connecting plates and a common terminal, which is preferably in the form of a strip disposed mostly edge-wise, relative to the connection support plate and the annular disc portions of the heat sinks and running around the inner circumference of the annular discs and insulated from them with an extension suitable for connecting to a brush directly or through a resistor. The annular disc structure is preferably provided with a cut-out of sector shape to provide space for accommodating brushes and/or a regulator.

The invention will be further described by way of example with reference to the accompanying drawings, in which.

Figure 1:
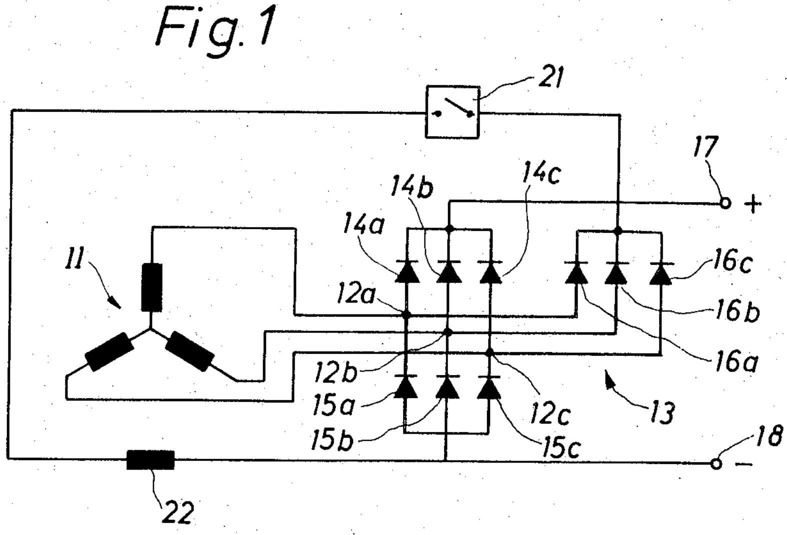
FIG. 1 is a circuit diagram of the rectifier unit and its connections to the windings of the alternator.

FIG. 1 shows the circuit of the rectifier unit and its connections with a three-phase alternator. The three connection leads of the stator winding 11 of the alternator are connected to the three alternating current terminals 12*a*, 12*b* and 12*c* of the rectifier unit 13. This rectifier unit comprises three positive pole diodes 14*a*, 14*b* and 14*c*, three negative pole diodes 15*a*, 15*b* and 15*c*, and also three exciter diodes 16*a*, 16*b* and 16*c*. The cathodes of the positive pole diodes 14 are connected to the output terminal 17, while the anodes of the negative pole diodes 15 are connected to the negative output terminal 18. The exciter diodes 16 are connected between the a.c. terminals of the rectifier and a common cathode connection, from which there is a connection over a voltage regulator 21 to an exciter winding 22 of the alternator, of which the other end is connected to the negative terminal 18.

Figures 2, 3:
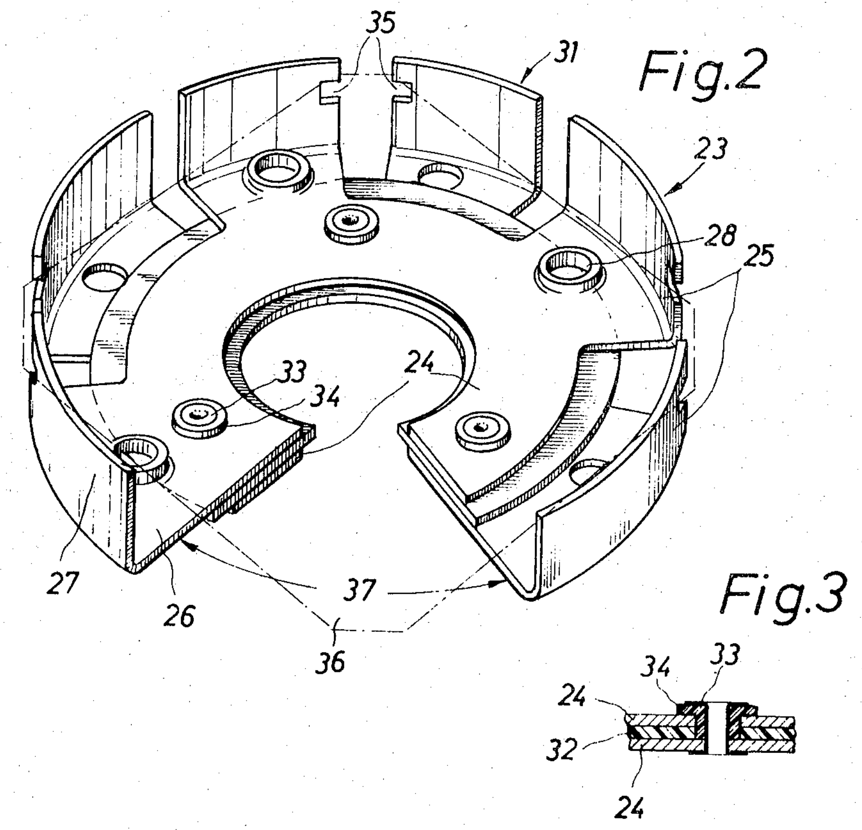
FIG. 2 is a perspective view of the heat sink bodies of the rectifier unit assembled with an intermediate insulating plate.
FIG. 3 is a cross section through a rivet fastening the heat sink bodies together.

FIG. 2 is a perspective view of a first illustrated embodiment of a rectifier unit. A first heat sink body, for example, the positive pole heat sink 23, has an annular disc portion 24 with peripheral extensions in the form of tabs 25. In the case of a 3-phase generator, the positive heat sink 23 is provided with three tab extensions 25. These tabs comprise a portion 26 extending out from the annular disc portion 24 in substantially the same plane and a second portion 27 bent at substantially a right angle to the first portion 26. Appertures 28 are provided in the first portion 26 of the heat sink 23 for seating the positive pole diodes 14.

A negative side heat sink 31 has a similar shape. It, too, has an annular disc portion 24 on the outer edge of which are tab-like extensions 25 bent up at right angles on a circle concentric with the annular disc. The positive heat sink 23 is placed on top of the negative heat sink 31 with insulating plate 32 in between. The insulating plate appropriately has an inner diameter which is the same or somewhat smaller than the inner diameter of the annular disc portion 24 of the heat sinks and has an outer diameter that is the same or slightly larger than the outer diameter of the annular disc portions 24. In this manner, reliable insulation of the heat sinks 23 and 31 from each other is provided.

The positive heat sink 23, the insulating plate 32 and the negative heat sink 31 are fastened in a sandwich structure, preferably by means of rivets 33. FIG. 3 is a detail of this fastening, in cross section. The rivet 33 can be electrically connected with one of the heat sink plates, for example, the heat sink plate 31, but it must then be insulated from the other heat sink plate 23.

This is accomplished, for example, by means of a flanged insulating bushing 34.

As shown in FIG. 2, the tabs 25 of each of the heat sinks 23 and 31 are narrower than the spaces between consecutive tabs of the same heat sink. When the heat sinks 23 and 31 are assembled, the tabs 25 of the negative heat sink 31 stick up between the tabs 25 of the positive heat sink 23 without any tabs of one heat sink touching a tab of the other. In practice, the second (bent up) portions (27) of the tabs are so dimensioned that their upper edges reach the same height when the rectifier unit is assembled. Notches 35 are provided in the upturned portions 27 of the tabs 25 for seating a circuit connection support plate 36.

The annular disc portions 24 of the heat sinks 23 and 31 are provided with a sector-shaped cut-out 37 for accommodating a brush holder (not shown) of the generator that serves to supply the current to the exciter winding 22 (FIG. 1) or for accommodating a voltage regulator 21 (FIG. 1), or both.

Figures 4, 5, 6, 7:
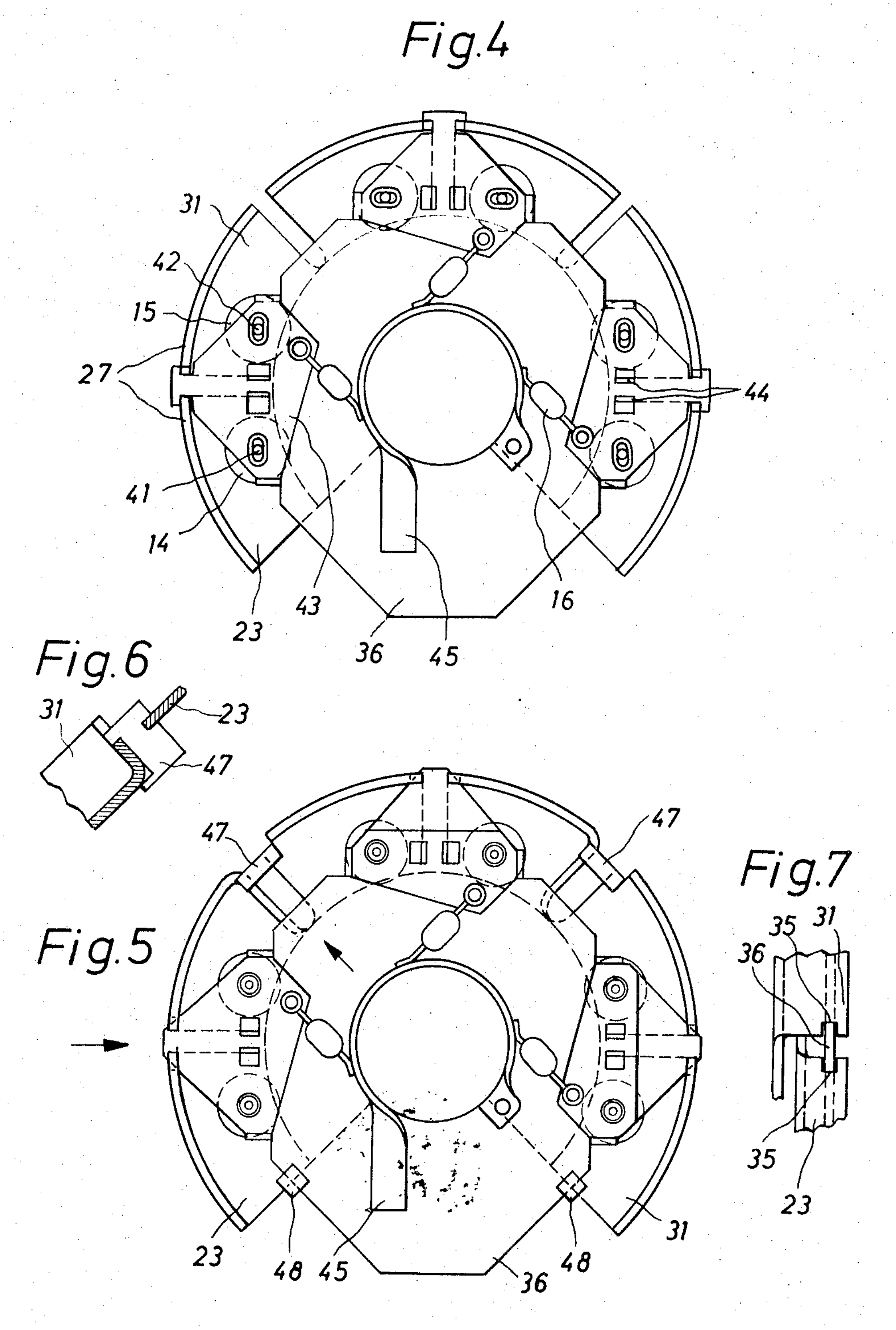
FIG. 4 is a plan view of the rectifier unit.
FIG. 5 is a plan view of a modified form of the rectifier unit.
FIG. 6 is an elevation view partly broken away and partly in cross section, in the direction of the diagonal arrow appearing in FIG. 5.
FIG. 7 is an elevation view, partly broken away, in the direction of the horizontal arrow appearing in FIG. 5.

FIG. 4 is a plan view of a fully assembled rectifier unit, from the side at which the ends of the tabs 25, 27 are located. The positive pole diodes 14 are inserted in the positive heat sink 23 and the negative pole diodes 15 are inserted in the negative heat sink 31. The three terminal leads of the diodes 14 and 15 extend in the direction of the upturned portions 27 of the tabs of the heat sinks, these leads being the anode leads 41 of the positive pole diodes and the cathode leads 42 of the negative pole diodes. These terminal leads 41 and 42 are connected to the alternating current terminals 12 shown in the circuit diagram of FIG. 1. In the embodiment of the invention shown in FIG. 4, the anodes 41 and the cathodes 42 of the respective paired diodes 14 and 15 are each connected to a conductive connection plate 43. In other words, one conducting plate 43 provides the connection between the anode 41 of one positive pole diode 14*a* with the cathode 42 of one negative pole diode 15*a* and at the same time with the alternating current terminal 12*a*.

The positive terminal 17 shown in the FIG. 1 circuit diagram is in effect the positive heat sink body 23 in the rectifier unit of FIG. 4 and likewise the negative terminal 18 is in effect the negative heat sink body 31. The connector plates 43 are provided with clips 44 for receiving connections to the stator winding 11. The lead wires of the cathodes of the exciter diodes 16 are also connected to the connector plates 43, in conformance with the FIG. 1 diagram. The anodes of the exciter diodes 16 are connected to an exciter diode bus 45, which is a strip running along the inner circumference of the annular disc 24. Of course, the exciter diode bus 45 is insulated from the heat sink bodies 23 and 31. In the illustrative embodiment of the invention shown in FIG. 4, this exciter diode bus is disposed edgewise, i.e., at right angles, to the annular disc 24 and to the circuit connection support plate 36 in the portion which runs along the inner circumference of the annular disc 24.

FIG. 5 shows a second illustrative embodiment of a rectifier unit according to the invention. The two heat sinks 23 and 31 are in this case not fastened together in a sandwich structure, but rather evenly spaced apart in an open structure. The elevated mounting is effected by electrically insulating clip members 47 and 48. The first clip members 47 are engaged between the sides of adjacent upturned portions 27 of the tabs 25, whereas the second clip members 48 engage part of the flat portions 26 of the tabs 25.

FIG. 6 is a detailed view in side elevation, as viewed from the inside of the device, of one of the first clip members 47 engaged between a part of the positive heat sink body 23 and a part of the negative heat sink body 31.

FIG. 7 is an external side view of the engagement by which the circuit connection support plate 36 is held in notches 35 of the heat sink bodies 23 and 31.

Although the invention has been disclosed with respect to particular embodiments, it will be understood that variations and modifications may be made within the inventive concepts.

We claim:

1. A rectifier unit for an alternator suitable for use in a vehicle, comprising:

first and second heat sink bodies, each in the form of a sheet metal annular disc with edge tabs bent at right angles to the disc, said discs being held in superposed mutually insulated position with their tabs in alternating circumferential sequence;

positive pole diodes mounted on and connected to said first heat sink body and negative pole diodes mounted on and connected to said second heat sink body, the anode connections of said positive pole diodes and the cathode connections of said negative pole diodes extending into the space enclosed by said tabs, and a circuit connection support plate held in position on said tabs and carrying at least connection means for connecting adjacent conjugate diodes together in pairs and connecting each pair to a winding terminal of said alternator.

2. A rectifier unit as defined in claim 1 in which said second heat sink body is in the outer position with reference to the space enclosed by said tabs.

3. A rectifier unit as defined in claim 1 in which said tabs (25) are each composed of a first portion (26) in the plane of the annular disc portion (24) of the heat sink body (23, 31) and a second portion (27) bent at substantially right angles to said first portion (26).

4. A rectifier unit as defined in claim 1 in which the respective annular disc portions (24) of said heat sink bodies (23, 31) each have a sector-shaped cut-out (37) to accomodate a brush holder and/or a regulator (21).

5. A rectifier unit as defined in claim 1 in which said tabs (25) have a width smaller than the gaps between two successive tabs of the same heat sink body, so that the tabs of the two heat sink bodies fit together with gaps between them.

6. A rectifier unit as defined in claim 1 in which an insulating plate (32) is provided between the annular disc portion (24) of said first heat sink body (23) and the annular disc portion (24) of said second heat sink body (31) to insulate one from the other, and that said annular disc portions (22) of the respective heat sink bodies are fastened together and with said insulating plate (22) by means of at least one rivet (33) insulated by an insulation bushing (34).

7. A rectifier unit as defined in claim 6 in which said insulating plate has an inner diameter that is equal to or smaller than the inner diameter of the annular disc portions of said heat sink bodies and an outer diameter that is equal to or greater than the outer diameter of said annular disc portions of said heat sink bodies.

8. A rectifier unit as defined in claim 1 in which said second portions (27) of said tabs (25) are provided with notches (35) in which corners or extensions of said circuit connection support plate (36) fit thereby fixing the relative position of said heat sink bodies (23, 31).

9. A rectifier unit as defined in claim 1 in which said second portions (27) of said tabs (25) are provided with notches (35) in which insulating clips are engaged for fixing the relative position of said heat sink bodies (23, 31).

10. A rectifier unit as defined in claim 3 in which the main current diodes, namely, said positive pole diodes (14) and negative pole diodes (15), are mounted on said heat sink bodies in the respective first portions (26) of their tabs (25).

11. A rectifier unit as defined in claim 3 in which said main current diodes, namely, said positive pole diodes (14) and said negative pole diodes (15), are mounted in said second portions (27) of said tabs (25).

12. A rectifier unit as defined in claim 1 in which the three electrode feeds of said positive pole diodes (14) mounted on said first heat sink body (23) are connected by an electrically conducting connection plate (43) to the three electrode connections of the negative pole diodes (15) on said second heat sink body (31).

13. A rectifier unit as defined in claim 12 in which exciter diodes (16) are connected between the respective aforesaid connection plates (43) and a common terminal.

14. A rectifier unit as defined in claim 13 in which the terminal leads of said exciter diodes (16), which are not connected to said connection plates (43), are connected to a conducting strip (45) disposed at least partiallly edgewise with respect to said circuit connection support plate and running along the inner circumference of one of said annular disc portions of a heat sink body, but insulated therefrom, within the space enclosed by said tabs.

* * * * *